US010168035B2

(12) United States Patent
Bardot

(10) Patent No.: US 10,168,035 B2
(45) Date of Patent: Jan. 1, 2019

(54) LIGHTING FIXTURE

(71) Applicant: PHILIPS LIGHTING HOLDING B.V., Eindhoven (NL)

(72) Inventor: Frederic George Bardot, Nivollet Montgriffon (FR)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 106 days.

(21) Appl. No.: 15/303,019

(22) PCT Filed: Apr. 2, 2015

(86) PCT No.: PCT/EP2015/057283
§ 371 (c)(1),
(2) Date: Oct. 10, 2016

(87) PCT Pub. No.: WO2015/155106
PCT Pub. Date: Oct. 15, 2015

(65) Prior Publication Data
US 2017/0038046 A1    Feb. 9, 2017

(30) Foreign Application Priority Data

Apr. 11, 2014  (EP) ...................................... 14305540

(51) Int. Cl.
*F21V 21/30*     (2006.01)
*F21S 8/02*      (2006.01)
(Continued)

(52) U.S. Cl.
CPC ............... *F21V 21/30* (2013.01); *F16H 1/10* (2013.01); *F16H 1/203* (2013.01); *F16H 19/001* (2013.01);
(Continued)

(58) Field of Classification Search
CPC ......... F21H 19/001; F21S 8/026; F21S 8/038; F21V 21/30; F21V 21/15; F21V 29/74; F21V 3/00; F21V 14/02
See application file for complete search history.

(56) References Cited

U.S. PATENT DOCUMENTS 6,547,410 B1 * 4/2003 Pederson ............. B60Q 1/2611
                                                                  362/272
6,705,745 B1 * 3/2004 Pederson ............. B60Q 1/2611
                                                                  362/284
(Continued)

FOREIGN PATENT DOCUMENTS

DE       102004023358 B3    4/2006
EP            1657486 A1    5/2006
(Continued)

*Primary Examiner* — Anabel Ton

(57) ABSTRACT

A lighting fixture having a generally planar light output window (10), comprising an outer housing (12), an inner housing (14) which is rotatably received within the outer housing (12) about a first axis perpendicular to the light output window (10), a plurality of light source carriers (40) mounted to the inner housing (14), wherein each light source carrier (40) is mounted for rotation about a second axis parallel to the light output window (10), light sources (72) carried by the light source carriers (40) for directing a light output to the light output window (10) and a rotary adjustment arrangement comprising a first adjustment element (22) for controlling rotation of the inner housing (14) with respect to the outer housing (12) and a second adjustment element (26) for controlling rotation of the light source carriers (40) with respect to the inner housing (14).

13 Claims, 8 Drawing Sheets

(51) Int. Cl.
*F21S 8/04* (2006.01)
*F21V 14/02* (2006.01)
*F21V 21/15* (2006.01)
*F21V 29/74* (2015.01)
*F16H 1/10* (2006.01)
*F16H 1/20* (2006.01)
*F16H 19/00* (2006.01)
*F21V 3/00* (2015.01)
*F21S 8/00* (2006.01)
*F21V 21/14* (2006.01)
*F21Y 105/10* (2016.01)
*F21Y 115/10* (2016.01)

(52) U.S. Cl.
CPC ............... *F21S 8/026* (2013.01); *F21S 8/038* (2013.01); *F21S 8/04* (2013.01); *F21V 3/00* (2013.01); *F21V 14/02* (2013.01); *F21V 21/15* (2013.01); *F21V 29/74* (2015.01); *F21S 8/03* (2013.01); *F21V 21/14* (2013.01); *F21Y 2105/10* (2016.08); *F21Y 2115/10* (2016.08)

(56) References Cited

U.S. PATENT DOCUMENTS

| | | | |
|---|---|---|---|
| 7,159,831 B2 * | 1/2007 | Gartner | ................ F16M 11/043 248/274.1 |
| 7,431,482 B1 | 10/2008 | Morgan et al. | |
| 8,021,013 B2 | 9/2011 | Russo et al. | |
| 8,215,805 B2 | 7/2012 | Cogliano et al. | |

FOREIGN PATENT DOCUMENTS

| | | | |
|---|---|---|---|
| EP | 2428720 | A2 | 3/2012 |
| GB | 2497925 | A | 7/2013 |
| JP | 2010192389 | A | 9/2010 |
| JP | 2011165566 | A | 8/2011 |
| JP | 2012129065 | A | 7/2012 |
| WO | 2010041182 | A1 | 4/2010 |

* cited by examiner (a)

(b)

LIGHTING FIXTURE

CROSS-REFERENCE TO PRIOR APPLICATIONS

This application is the U.S. National Phase application under 35 U.S.C. § 371 of International Application No. PCT/EP2015/057283, filed on Apr. 2, 2015, which claims the benefit of European Patent Application No. 14305540.8, filed on Apr. 11, 2014. These applications are hereby incorporated by reference herein.

FIELD OF THE INVENTION

This invention relates to a lighting fixture, and in particular a lighting fixture that enables directional control of the light output.

BACKGROUND OF THE INVENTION

Downlights and spotlights are in very widespread use by architects, interior designers as well as end-users for creating a desired interior style.

Downlights are generally used for general illumination purposes and usually produce a relatively broad beam, whereas spotlights are typically aimed at a certain target by tilting and rotating the spotlight.

Recently, advances in lighting technology, especially in the field of light emitting diodes (LEDs) and LED-based luminaires, have enabled flat and compact light output devices, such as luminaires, which are easier to install and more compact and unobtrusive than conventional lighting systems.

For downlights, the use of this new type of flat luminaires is relatively straightforward. For spotlights, however, mechanical arrangements are needed for controlling the direction of the light output, and these can be relatively bulky.

FIG. 1a schematically illustrates a flat and compact downlight 1, which is mounted on a ceiling 2 to emit light straight down. Such a downlight 1 may, for example, be based on semiconductor light-sources, such as LEDs, and a lightguide arrangement for conditioning (mixing and distributing) the light emitted by the light-sources.

FIG. 1b schematically illustrates a conventional spotlight 3, which is mounted on the ceiling 2 via an ordinary mechanical beam direction controlling device 4. By manually tilting and rotating the spotlight 3, the direction of the light-beam 5 emitted thereby can be controlled at will.

If one would straightforwardly combine the flat and compact downlight 1 in FIG. 1a with the mechanical beam direction controlling device 4 in FIG. 1b, one would arrive at a spotlight based on the flat downlight 1 in FIG. 1a and the mechanical housing of FIG. 1b. However, many of the features of the downlight 1 in FIG. 1a that make it attractive for deployment in various lighting solutions would then be lost.

In order to provide a user controllable spotlight while maintaining many of the attractive features of the downlight 1 in FIG. 1a, various embodiments of beam direction controlling device are known, for example as schematically shown in FIG. 2, which shows a light-output device in the form of a controllable spotlight comprising a flat and compact light-emitting device 1 similar to the downlight 1 in FIG. 1a and an optical beam direction controlling device 6 arranged such that light emitted by the light emitting device 1 passes through the beam direction controlling device when the spotlight is in operation.

WO2010/041182 discloses an arrangement as shown in FIG. 2 in which the beam direction controlling device 6 for example comprises first 7 and second 8 optical elements, each of which is moveable in a plane parallel to the ceiling 2 using first and second actuators, by which the user can move the first and second optical elements independently of each other. Through operation of the actuators the direction of the light beam 9 emitted by the spotlight can be controlled.

This type of arrangement enables integration into a flat luminaire, but the optical elements reduce the optical efficiency of the system compared to a mechanical alignment solution.

There is therefore a need for a mechanical beam steering approach which can be made compact and easy to use.

SUMMARY OF THE INVENTION

The invention is defined by the claims.

According to the invention, there is provided a lighting fixture having a generally planar light output window, comprising:

an outer housing;

an inner housing which is rotatably received within the outer housing about a first axis perpendicular to the light output window, wherein an output face of the lighting fixture is defined by a surface of the inner housing, a surface of the outer housing and the light output window;

at least one light source carrier mounted to the inner housing, wherein the light source carrier is mounted for rotation about a second axis parallel to the light output window;

a light source carried by the light source carrier for directing a light output to the light output window; and a rotary adjustment arrangement, comprising a first adjustment element for controlling rotation of the inner housing with respect to the outer housing and a second adjustment element for controlling rotation of the light source carrier with respect to the inner housing.

This design provides a compact adjustable design. By defining an output face of the lighting fixture as inner and outer housings, e.g. concentric circular/annular portions, the space occupied by the adjustment arrangement can be as small as possible. The inner and outer housings provide pan control, so that the inside of the lighting fixture only needs to implement tilt control.

The outer housing may comprise a gear wheel with inner teeth, which at least partially surrounds the inner housing, and the first adjustment element comprises a cog which engages with the gear wheel.

This provides a rotation of the inner housing within the outer housing by simple rotation of the cog.

The rotary adjustment arrangement may be linearly movable between a first position in which the first adjustment element is engaged and the second adjustment element is disengaged, and a second position in which the first adjustment element is disengaged and the second adjustment element is engaged.

This design enables a single adjustment arrangement to be used to control rotation about a first axis (for a ceiling mounted fixture, this is a vertical axis and the movement is panning) and a second perpendicular axis (for a ceiling mounted fixture, this is a horizontal axis and the movement is tilting). This provides a simple to adjust lighting fixture, in particular using a single control mechanism.

A spring may be provided for biasing the rotary adjustment arrangement to the first position. This means that rotation of the rotary adjustment arrangement normally causes the rotation between the inner and outer housings. For control of the inner housing tilt angle, the rotary adjustment arrangement is moved against the spring bias. This may be achieved by applying a pushing force.

The light source carrier may comprise a toothed rack, the inner housing may comprise a worm gear for engaging with the toothed rack, and the second adjustment element is for then driving the worm gear. The worm gear preferably extends in a direction parallel to the light output face. This provides a compact arrangement, for example with the worm gear extending over the top of the light source carrier.

The second adjustment element may then comprise a first bevelled cog, which engages with a second bevelled cog at the end of the worm gear, wherein the first and second bevelled cogs are brought into engagement in the second position.

A stop may be provided for limiting the rotation of the light source carrier when the worm gear reaches either end of the toothed rack. This means that even if the rotary adjustment arrangement is rotated right to one end of the control range, rotation in the opposite direction will enable the light source carrier to be rotated back again.

A plurality of light sources may be carried by the light source carrier, the plurality of light sources being arranged in a line. All light sources in the line can have their output directed in parallel directions. A plurality of light source carriers can also or instead be provided.

For example, there can be a plurality of light sources carried by each light source carrier, each plurality of light sources being arranged in a line, to define an array of light sources. Each line may be staggered with respect to the adjacent line or lines. This reduces the overlap between the light source outputs to provide a more efficient illumination.

The inner housing may for example be rotatable with respect to the outer housing by at least 300 degrees (up to nearly 360 degrees), and the light source carrier is rotatable with respect to the inner housing by at least 40 degrees (for example 45 degrees or more). The full rotation of the inner housing means the 40 (or 45) degree light source carrier rotation can cover a large 80 (or 90 or more) degree range of adjustment.

The lighting fixture may have a recessed control port in a lower face of the inner housing for receiving an external rotational drive tool to provide rotation and linear movement of the rotary adjustment arrangement. This enables manual adjustment using a single tool, with a rotation operation and a push-and-rotate operation for the two different adjustments. Alternatively, a motorised drive arrangement can be used for providing control of the rotary adjustment arrangement.

Preferably, a lower face of the inner housing and a lower face of the outer housing are flush. This provides a flush lower surface suitable for use as a recessed light fitting.

The lighting fixture may comprise:
a ceiling light for flush recessed mounting in a ceiling; or
a surface mounted lighting unit; or
a rail mounted lighting unit.

BRIEF DESCRIPTION OF THE DRAWINGS

Examples of the invention will now be described in detail with reference to the accompanying drawings, in which.

DETAILED DESCRIPTION OF THE EMBODIMENT

The invention provides a lighting fixture having a generally planar light output face, comprising an outer housing and an inner housing which is rotatably received within the outer housing about a first axis (e.g. vertical). A light source carrier is mounted to the inner housing rotatable about a second axis (e.g. horizontal). A rotary adjuster has a first element for controlling rotation of the inner housing with respect to the outer housing and a second element for controlling rotation of the light source carrier with respect to the inner housing. In one design, the adjuster is linearly movable between a two positions to engage the elements individually.

Figure 1A:
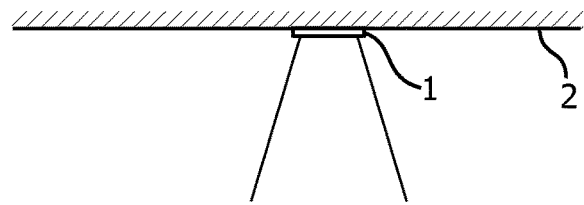
FIG. 1 shows a known LED downlight and an adjustable spot light.
Figure 1B:
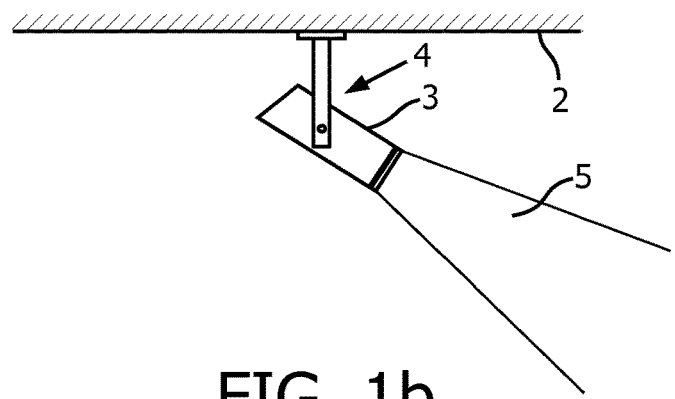
Figure 2:
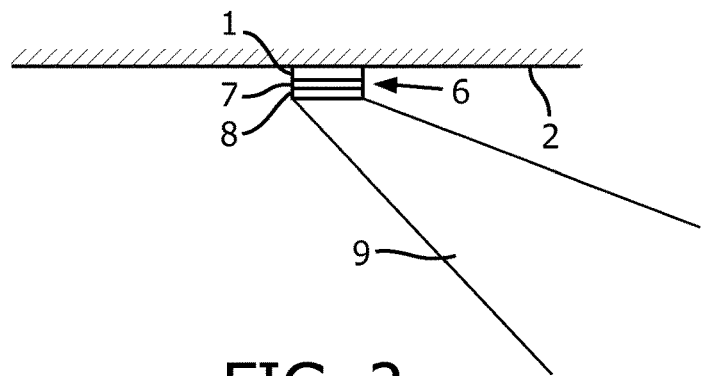
FIG. 2 shows a known adjustable LED downlight using an optical beam steering arrangement.
Figure 3:
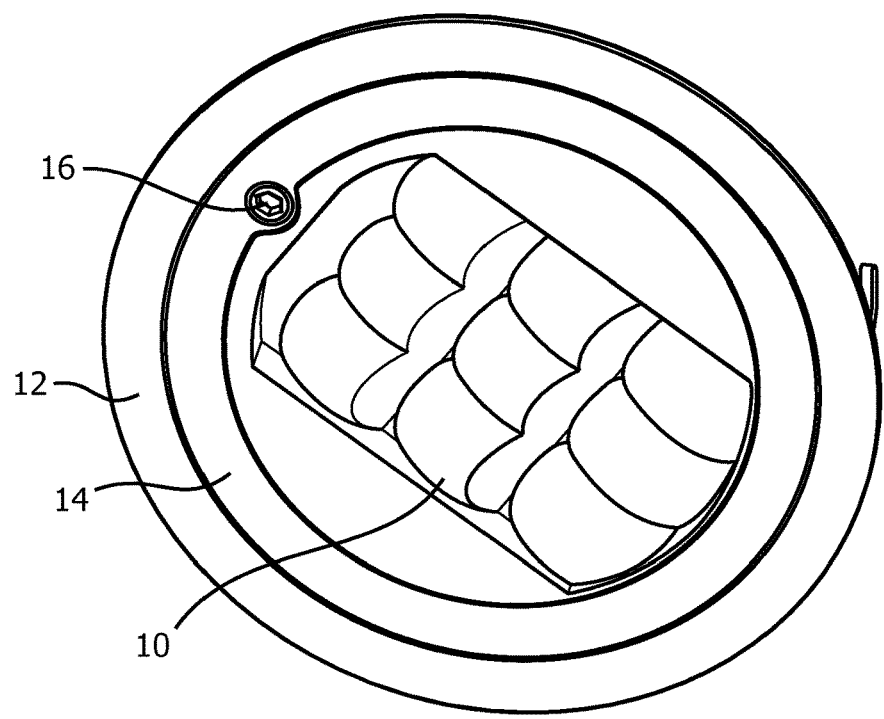
FIG. 3 shows an example of lighting fixture of the invention, showing the part which is in view in use.

FIG. 3 shows the surface of the light fixture as viewed from beneath. The fixture has a generally planar output face, which includes a light output window 10 so that the fixture has a flush appearance, and can be a replacement for a spot bulb. The fixture has an outer housing 12 and an inner housing 14 which is rotatably received within the outer housing about a first axis perpendicular to the light output face. This provides a panning adjustment. The lower face of the inner housing and the lower face of the outer housing define part of the output face, and they are flush in this example to give a smooth outer appearance.

The inner housing 14 has a circular output face within with the light output window 10 is defined, and the outer housing an annular output face around the inner housing.

The light output window 10 can be a flat plate for example of glass or plastic, but it may instead include shaped optics to define a beam shaping function. The shaped optics may give a non-flat outer surface, or else the shaped optics may only be on the inside surface so that the outer surface can be flat, but the output window can still provide a beam shaping function.

In the example of FIG. 3, a recessed control port 16 is provided in the lower face of the inner housing 14 for receiving an external rotational drive tool to provide rotational adjustment of the inner housing 14. As explained below, in some examples the same control port also enables a tilt function to be implemented.

The fixture includes at least one light source carrier mounted to the inner housing and a light source carried by the light source carrier. The example of FIG. 3 has a 3×3 array of light sources with 3 light sources on each of 3 light source carriers. The light source carriers are mounted for rotation about a respective second axis parallel to the light output face, and this provides a tilting adjustment.

Figure 4:
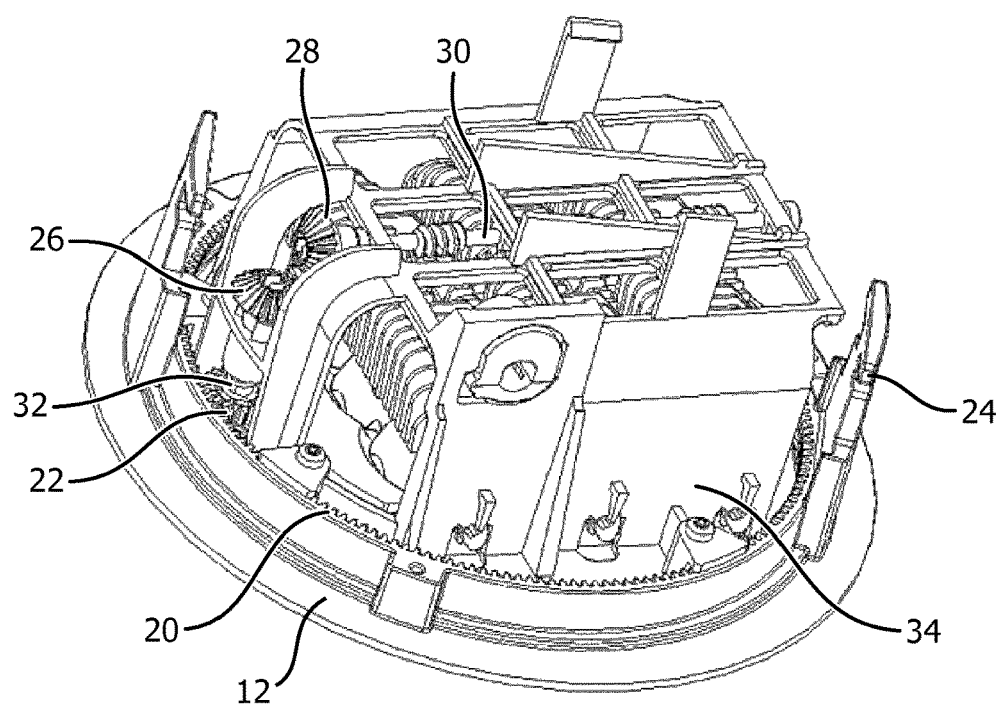
FIG. 4 shows the lighting fixture of FIG. 3, showing the part which is not in view in use.

FIG. 4 shows the lighting fixture from behind.

The outer housing 12 has a gear wheel 20 with inwardly facing teeth, which at least partially surrounds the inner housing. The control port 16, described above in reference to FIG. 3, is coupled to a cog 22 which engages with the gear wheel 20 and which functions as a first adjustment element. By rotating the cog 22, the inner housing rotates relative to the outer housing. The outer housing is fixed, for example clamped to a circular opening in the ceiling, by means of spring fittings 24 or arms which provide a frictional fit.

The control port is not only rotationally linked to a cog 22 but also to a first bevelled cog 26, which functions as a second adjustment element. The first bevelled cog 26 engages with a second bevelled cog 28 at the end of a worm gear 30.

The first and second bevelled cogs 26,28 are brought into or out of engagement by linear movement of the first bevelled cog 26 along the direction of the axis of rotation.

The worm gear 30 is used to tilt the multiple light source carriers to change the direction in which the light source output is provided.

The cog 22 and first bevelled cog 26 together can be considered to constitute a rotary adjustment arrangement. The cog 22 is for controlling rotation of the inner housing with respect to the outer housing, and the bevelled cog 26 is for controlling rotation of the light source carrier with respect to the inner housing. The rotary adjustment arrangement is linearly movable between two positions. In a first position (as shown in FIG. 4) the cog 22 is engaged with the gear wheel 20 and the bevelled cogs 26,28 do not engage. In a second position, the cog 22 is moved out of engagement with the gear wheel 20 but the bevelled cogs 26,28 are engaged.

Thus, there are two positions for the adjustment arrangement. One enables the inner housing angular position to be set. The other enables a tilt of the light sources to be controlled. A spring 32 biases the rotary adjustment arrangement to the first position in which the cog 22 engages with the gear wheel 20. This means that rotation of the rotary adjustment arrangement normally causes the rotation between the inner and outer housings. For control of the worm gear 30, the rotary adjustment arrangement is moved against the spring bias. This may be achieved by applying a pushing force.

The inner housing 14 comprises a frame structure 34 within which the tilting light source carriers are provided.

Figure 5:
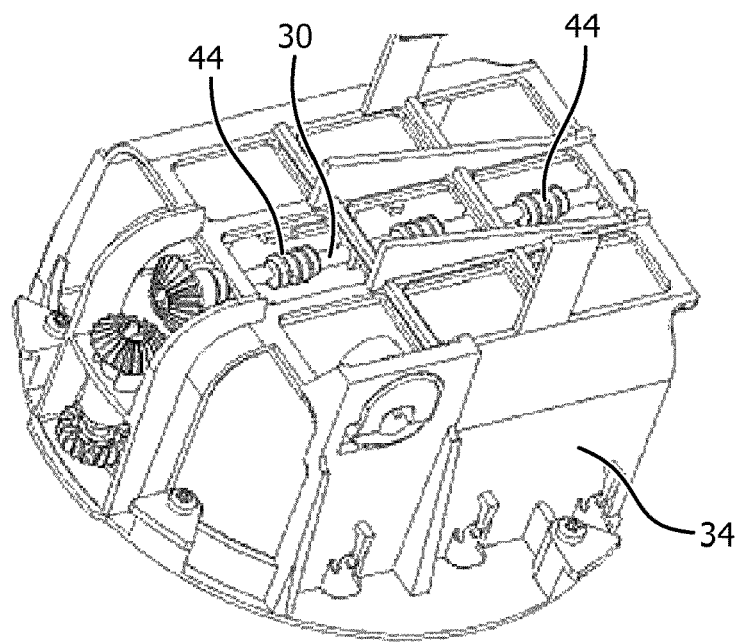
FIG. 5 shows the inner housing of the fixture of FIG. 4 more clearly.

FIG. 5 shows the frame structure 34 on its own.

Figure 6:
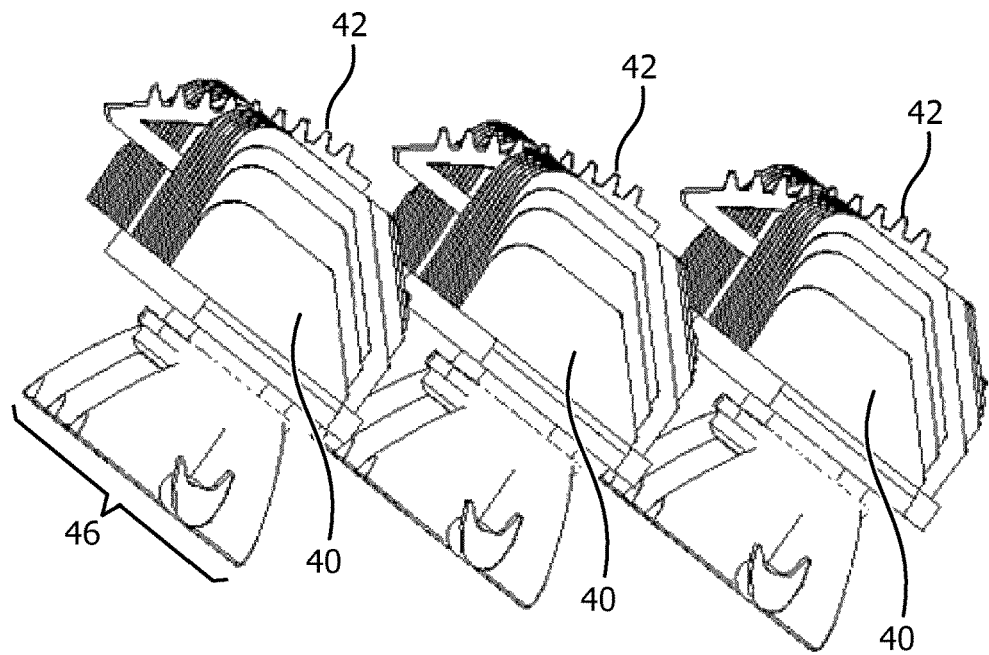
FIG. 6 shows the light source carriers of the fixture of FIG. 4 more clearly.

FIG. 6 shows the set of light source carriers. In the example shown, there are three rows of light sources, each row sharing a carrier 40.

Each of these light source carriers 40 has a toothed rack 42. The racks are aligned, so that they are all controlled simultaneously by the single worm gear 30. The worm gear 30 comprises a shaft with threaded portions 44 (see FIG. 5) for engaging with the racks 42. When the worm gear 30 is rotated, the toothed racks 42 are driven. They cause rotation of the carriers 42 about an axis parallel to the light output face and thereby cause tilting of the light source carriers as shown by arrow 46. The worm gear 30 extends in a direction parallel to the light output face over the top of the light source carriers 42. This provides a compact arrangement.

The inner housing may be able to rotate almost fully within the outer housing, for example for rotation about the vertical axis by around 355° to implement panning adjustment. The tilting of the light source carriers may for example be over a range 0° to 45° to implement tilting. The full panning adjustment means that the tilt angle can then be controlled between −45° and +45°. More generally, the inner housing may for example be rotatable with respect to the outer housing by at least 300 degrees (up to nearly 360 degrees), and the light source carrier is rotatable with respect to the inner housing by at least 40 degrees.

This design enables a single adjustment arrangement to be used to control rotation about a first axis (for a ceiling mounted fixture, this is a vertical axis and the movement is panning) and a second perpendicular axis (for a ceiling mounted fixture, this is a horizontal axis and the movement is tilting). This provides a simple to adjust light fixture, in particular using a single control mechanism.

Figure 7:
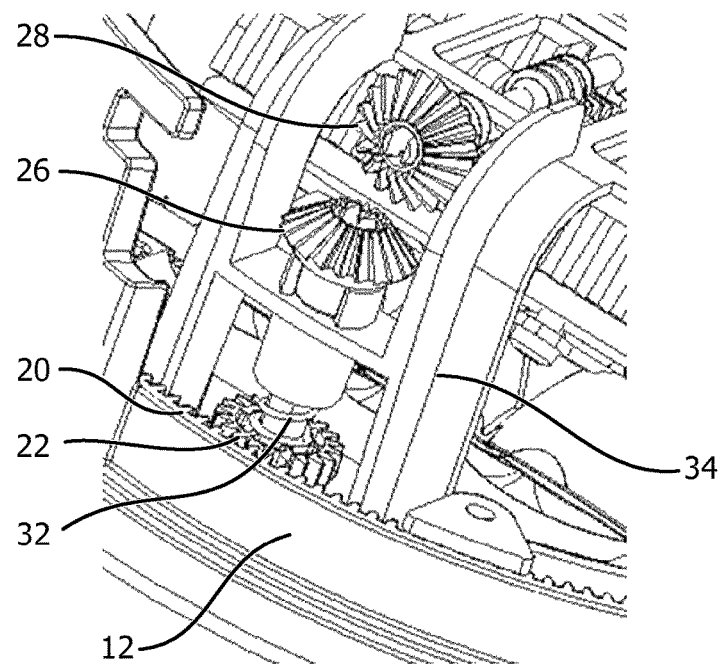
FIG. 7 shows the rotary adjustment arrangement of the fixture of FIG. 4 more clearly.

FIG. 7 shows the features of the rotary adjustment arrangement 22,26,32 more clearly.

Figure 8:
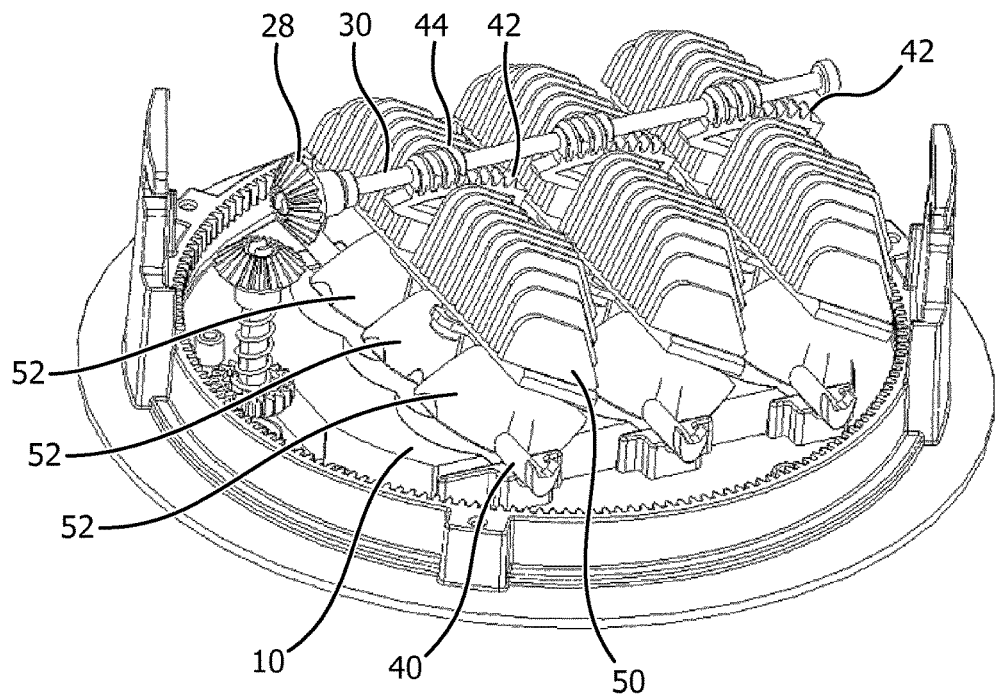
FIG. 8 shows how the light source carriers of the fixture of FIG. 4 are rotated more clearly.

FIG. 8 shows the light source carriers 40 in place but with the frame structure 34 removed.

Each light source carrier can comprise a heat sink part 50 and reflector parts 52. Each reflector 52 is for an associated LED which is mounted at the base of the reflector.

The worm gear 30 is designed so that the rotary adjustment can be made to the very end of the range of adjustment without damaging the mechanism. For this purpose, the threaded portions 44 are of limited length. This means that at the end of the adjustment range (in either direction), the toothed racks 42 come out of engagement with the threaded portions 44, and the worm gear can rotated freely without engaging with the toothed rack 42.

In this way, when the light source carrier is at the end of the rotation between 0° and 45°, the toothed rack 42 is released from the worm wheel 30. However, to ensure that they can be brought back into engagement (when adjusting in the opposite sense) the parts are kept under pressure, as explained with reference to FIGS. 9 and 10.

Figure 9:
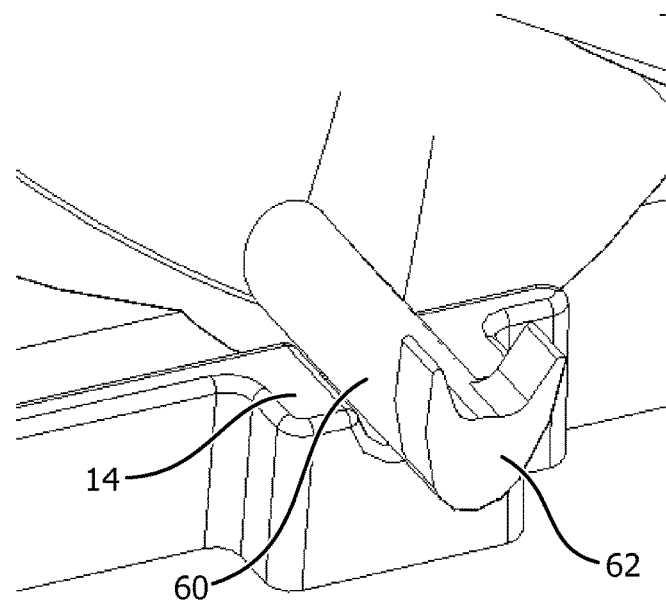
FIG. 9 shows a stop arrangement which is part of the light source carriers of the fixture of FIG. 4.

The light source carrier 40 has an output shaft 60, as illustrated in FIG. 9, which lies on the axis of rotation of the light source carrier. It rests in a support channel formed as part of the inner housing 14. The end of the output shaft 60 has a control head 62 which has two limiting stops 64.

Figure 10:
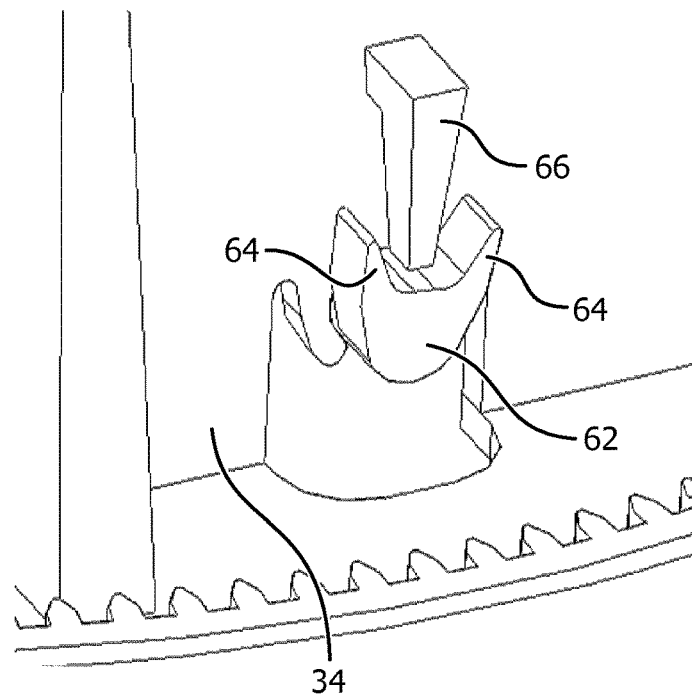
FIG. 10 shows how stop arrangement of FIG. 9 interacts with the inner housing.

The frame structure 34 has a blade 66 (see FIG. 10). When the light source carrier is at the limit of its angular movement range, the stops 64 press against the blade 66 to prevent further movement of the light source carrier, and to ensure that the threaded portion 44 can engage with the toothed rack 42 when the worm gear is rotated in the opposite direction.

In this way, the stops 64 limit the rotation of the light source carrier when the worm gear threaded portions 44 reach either end of the toothed rack 42.

Figure 11:
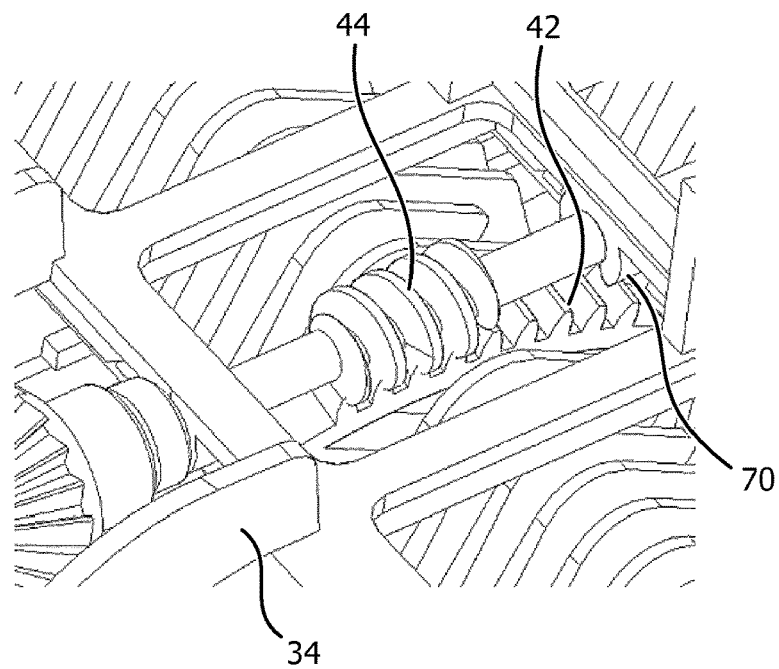
FIG. 11 shows how the worm gear of the fixture of FIG. 4 is held in place.
Figure 12:
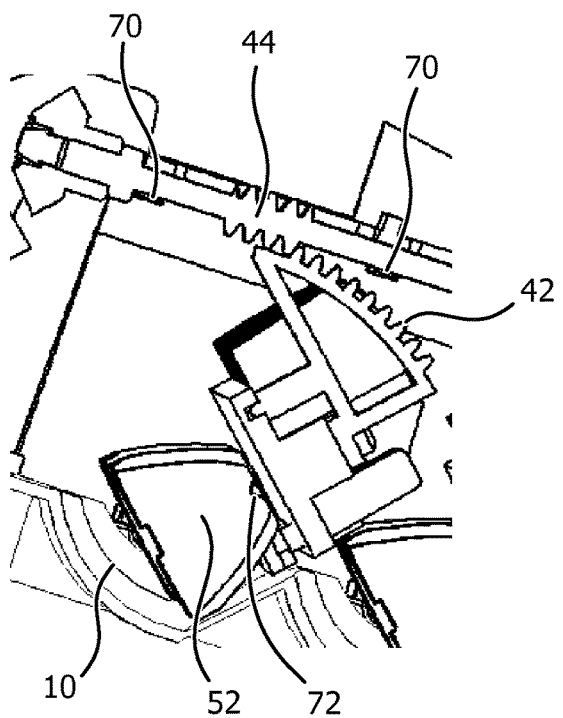
FIG. 12 shows more clearly how the worm gear of the fixture of FIG. 4 implements its adjustment.

FIGS. 11 and 12 show the engagement between the threaded portion 44 of the worm gear and the toothed rack 42. They also shows that the worm gear is a snap fit into a set of channels 70 defined by the frame structure 34.

The LED bulb 72 is shown in FIG. 12 at the base of the reflector 52.

The example above shows an array of 3×3 LEDs. However, the same structure may be used at the limit for a single LED. There may instead by a single light source carrier 40 but with a plurality of light sources carried by the single light source carrier, the plurality of light sources being arranged in a line. This defines a linear array of light sources, and the light sources in the line preferably have their output directed in parallel directions.

The example shown instead has a plurality of light source carriers, and each with their own respective line of light sources.

Figure 13:
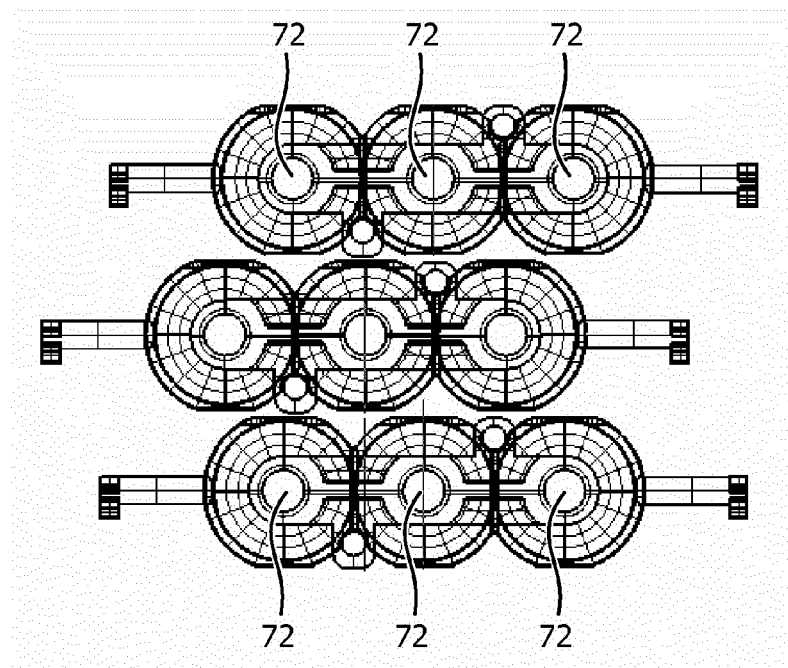
FIG. 13 shows an arrangement of light sources with staggered rows.

When a 2D array of light sources is provided as shown in the example above, they do not need to define a regular rectangular array. For example each line of light sources may be staggered with respect to the adjacent line or lines. This is shown in FIG. 13. This reduces the overlap between the light source outputs to provide a more efficient illumination.

Figure 14:
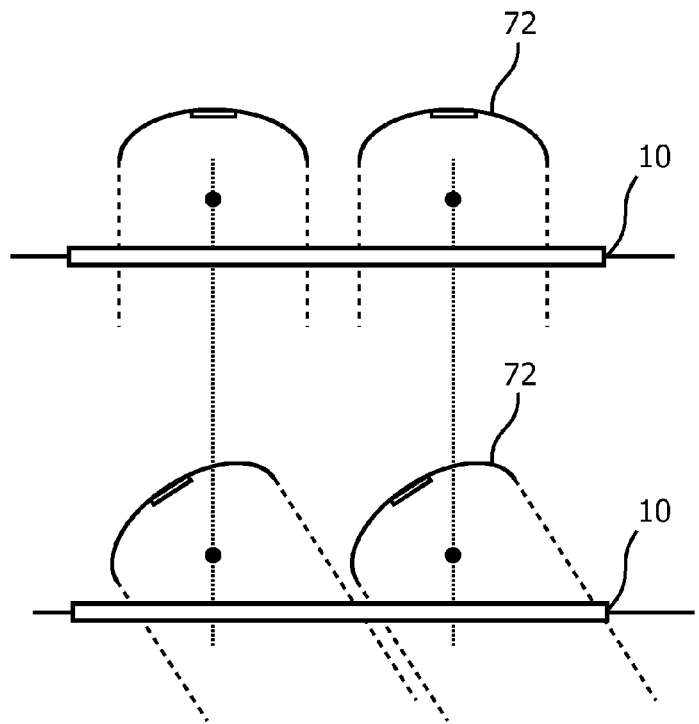
FIG. 14 is used to show how the light source should be arranged to prevent overlap of their light output for all angular settings.

The arrangement of the light source carriers preferably avoids this overlap between the light outputs from the different light sources. As shown in FIG. 14, this means that spacing is required between the light source carriers so that when they are tilted the beams still do not overlap. Furthermore, to enable the full light output to be projected, there needs to be a spacing between the edge of the light output face 10 and the edge of the outermost light source carrier.

In the example above, the control port 16 is for accepting an external tool (such as an Allen key) which is used to control the rotation as well as the linear position of the rotary adjustment arrangement. This enables manual adjustment using a single tool, with a rotation operation for the pan control and a push-and-rotate operation for the tilt control Alternatively, a motorised drive arrangement can be used for providing control of the rotary adjustment arrangement. In one implementation, the motorized drive may use the same arrangement, with one rotary driver and one linear driver (so that the linear driver selects between the cog 22 and the worm gear). However, if a motorized drive is used, separate rotary drivers may be provided, one for the worm gear and one for the cog. In this case, there is no need for the cog 22 and worm gear to be essentially fixed relative to each other. For example the gear wheel 20 may then be part of the inner housing, with outwardly facing teeth, and the cog can be fixed in position with respect to the outer housing.

In this case, the bevelled gears 26,28 and spring 32 are also not needed. A mechanical override port may be provided or else no such mechanical input is needed.

The two drivers (two rotary drivers or else one linear driver and one rotary driver) can be controlled by a remote control unit, which may for example be implemented by a mobile telephone.

Figure 15:
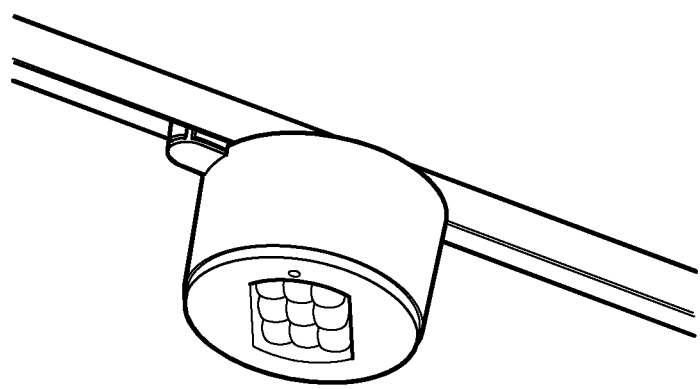
FIG. 15 shows two further possible light fittings.
Figure 15:
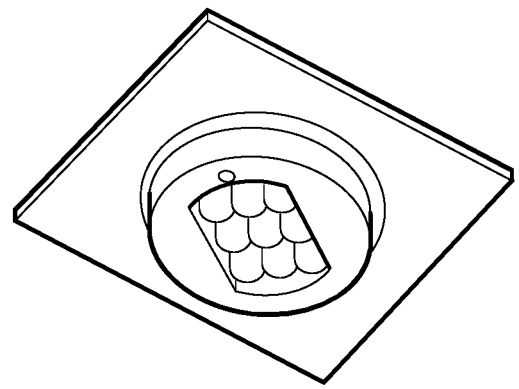

The example above is for mounting as a recessed light unit, such as a spot light recessed into a ceiling. However, the same adjustment mechanism may be used for other types of lighting arrangement, such as a rail mounted lighting unit as shown in FIG. 15(a) or a surface mounted lighting unit as shown in FIG. 15(b).

By providing a compact mechanical adjustment arrangement, the advantage of compactness of previous optical solutions is obtained, but with improved optical efficiency, such as light output ratio, beam quality, and constant beam angle regardless of tilt or pan position.

When an external tool is to be used, the arrangement using a cog and bevelled gear along the same shaft enables the two rotation functions to be implemented by the same tool. The control port 16 is then part of the inner housing, so that the control port is at a fixed position relative to the light source carriers.

For a manual adjustable arrangement, it is also possible to provide separate adjustment ports. For example one rotary input can drive the cog 22 (again this may then be fixed in position with respect to the outer housing instead of the inner housing) and a second rotary input can drive the worm gear. As discussed above for the motorized version with separate motors, this avoids the need for the spring arrangement and for the separable bevelled cogs, since the second rotary input can be permanently coupled to the worm gear.

The invention is of interest for LED lighting, but the adjustment approach can be applied to other light sources. The LED lighting fixture can be a replacement for a spot bulb fitting which fits into the same size circular opening as a conventional halogen recessed spot light fixture.

In the case of a motorised version, the lighting fixture may be programmable to store pre-set preferred lighting settings, so that the settings can be selected according to the desired lighting effect. In addition to the directional output, the optical properties (intensity, colour temperature) may also be controlled.

In the examples above, the lines of light source carriers 40 are all moved in the same way and by the same angle, so that the beam shape remains substantially the same when the beam direction is moved. However, an alternative is for different beam directions to give different beam shapes. For example a downwardly directed beam may give a narrow circular spot whereas a beam directed at a steep angle may be intended for illuminating a wall with a different shaped beam, such as an elliptical beam. This can achieve a so-called wall washer lighting effect.

To achieve this, the toothed racks 42 may be different. For example the rate of change of angle may be different for different rows of light sources, by having differently spaced teeth. Also, the range of angular control of each row of light source carriers may be different, for example with one being adjustable to 15 degrees, one being adjustable to 30 degrees and one adjustable to 45 degrees. The toothed racks 42 or the threaded parts 44 of the worm gear can be altered to create these different effects.

A narrow but positionally controllable beam may for example be used to illuminate a picture hanging on a wall, whereas a broader beam may for example be used to illuminate a wall generally (wall washer lighting), or illuminate a larger object on the wall, such as a large fish tank.

A motorised control enables further possibilities. For example, if each bank of light source carriers 40 has an independent motor (instead of a shared worm wheel 30), then any of these possible effects can be provided. The light sources can be driven in synchronism to move a narrow spot beam, or else a wider beam can deliberately be created and the direction of such a wider beam can be controlled.

A motorised system can be controlled wirelessly either by a dedicated remote control or by a remote control integrated into another device, such as a mobile telephone or an television or other remote control. For a newly installed system, there may of course be dedicated wiring for provide control commands to the lighting system, or control commands may be placed on the mains lighting supply.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A lighting fixture having a generally planar light output window, comprising:
    an outer housing;
    an inner housing which is rotatably received within the outer housing about a first axis perpendicular to the light output window, wherein an output face of the lighting fixture is defined by a surface of the inner housing, a surface of the outer housing and the light output window;
    a plurality of light source carriers mounted to the inner housing, wherein each light source carrier is mounted for rotation about a second axis parallel to the light output window;
    light sources carried by the light source carriers for directing a light output to the light output window; and
    a rotary adjustment arrangement comprising a first adjustment element for controlling rotation of the inner housing with respect to the outer housing and a second adjustment element for controlling rotation of the light source carriers with respect to the inner housing, and
    wherein the outer housing comprises a gear wheel with inner teeth, which at least partially surrounds the inner housing, and the first adjustment element comprises a cog which engages with the gear wheel.

2. A lighting fixture having a generally planar light output window, comprising:
    an outer housing;
    an inner housing which is rotatably received within the outer housing about a first axis perpendicular to the light output window, wherein an output face of the lighting fixture is defined by a surface of the inner housing, a surface of the outer housing and the light output window;
    a plurality of light source carriers mounted to the inner housing, wherein each light source carrier is mounted for rotation about a second axis parallel to the light output window;
    light sources carried by the light source carriers for directing a light output to the light output window; and
    a rotary adjustment arrangement comprising a first adjustment element for controlling rotation of the inner housing with respect to the outer housing and a second adjustment element for controlling rotation of the light source carriers with respect to the inner housing,
    wherein each of the light source carriers comprise a toothed rack, the inner housing comprises a worm gear for engaging with the toothed rack, and the second adjustment element is for driving the worm gear.

3. A lighting fixture as claimed in claim 2, wherein the worm gear extends in a direction parallel to the light output face.

4. A lighting fixture as claimed in claim 2, comprising a stop for limiting the rotation of the light source carriers when the worm gear reaches either end of the toothed rack.

5. A lighting fixture as claimed in claim 1, wherein the rotary adjustment arrangement is linearly movable between a first position in which the first adjustment element is engaged and the second adjustment element is disengaged, and a second position in which the first adjustment element is disengaged and the second adjustment element is engaged.

6. A lighting fixture as claimed in claim 5, comprising a spring for biasing the rotary adjustment arrangement to the first position.

7. A lighting fixture as claimed in claim 5, wherein the second adjustment element comprises a first bevelled cog, which engages with a second bevelled cog at the end of the worm gear, wherein the first and second bevelled cogs are brought into engagement in the second position.

8. A lighting fixture having a generally planar light output window, comprising:
    an outer housing;
    an inner housing which is rotatably received within the outer housing about a first axis perpendicular to the light output window, wherein an output face of the lighting fixture is defined by a surface of the inner housing, a surface of the outer housing and the light output window;
    a plurality of light source carriers mounted to the inner housing, wherein each light source carrier is mounted for rotation about a second axis parallel to the light output window;
    light sources carried by the light source carriers for directing a light output to the light output window; and
    a rotary adjustment arrangement comprising a first adjustment element for controlling rotation of the inner housing with respect to the outer housing and a second adjustment element for controlling rotation of the light source carriers with respect to the inner housing, wherein each light source carrier carries a plurality of light sources, the plurality of light sources being arranged in a line.

9. A lighting fixture as claimed in claim 1, comprising a plurality of light sources carried by a plurality of light source carriers, each plurality of light sources of a respective carrier being arranged in a line, wherein each line is staggered with respect to the adjacent line or lines.

10. A lighting fixture having a generally planar light output window, comprising:
    an outer housing;
    an inner housing which is rotatably received within the outer housing about a first axis perpendicular to the light output window, wherein an output face of the lighting fixture is defined by a surface of the inner housing, a surface of the outer housing and the light output window;
    a plurality of light source carriers mounted to the inner housing, wherein each light source carrier is mounted for rotation about a second axis parallel to the light output window;
    light sources carried by the light source carriers for directing a light output to the light output window; and
    a rotary adjustment arrangement comprising a first adjustment element for controlling rotation of the inner housing with respect to the outer housing and a second adjustment element for controlling rotation of the light source carriers with respect to the inner housing, wherein the inner housing is rotatable with respect to the outer housing by at least 300 degrees, and each light source carrier is rotatable with respect to the inner housing by at least 40 degrees.

11. A lighting fixture as claimed in claim 1, comprising a recessed control port in a lower face of the inner housing for receiving an external rotational drive tool to provide rotation and linear movement of the rotary adjustment arrangement.

12. A lighting fixture as claimed in claim 1, comprising a motorised drive arrangement for providing driving of the rotary adjustment arrangement.

13. A lighting fixture as claimed in claim 1, comprising:
a ceiling light for flush recessed mounting in a ceiling; or
a surface mounted lighting unit; or
a rail mounted lighting unit.

\* \* \* \* \*